US011079732B2

United States Patent
Gupta et al.

(10) Patent No.: US 11,079,732 B2
(45) Date of Patent: Aug. 3, 2021

(54) BUILDING MANAGEMENT SYSTEM WITH UPDATE ECOSYSTEM

(71) Applicant: Johnson Controls Technology Company, Auburn Hills, MI (US)

(72) Inventors: Vivek V. Gupta, Shorewood, WI (US); Justin J. Seifi, Cedarburg, WI (US); Brandon A. Sloat, New Berlin, WI (US); John K. Krenzer, St. Francis, WI (US); Jameel Ahmed, Milwaukee, WI (US); Mark T. Fischbach, Milwaukee, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/777,406

(22) Filed: Jan. 30, 2020

(65) Prior Publication Data

US 2020/0249646 A1    Aug. 6, 2020

Related U.S. Application Data

(60) Provisional application No. 62/799,668, filed on Jan. 31, 2019.

(51) Int. Cl.
| | |
|---|---|
| *G05D 23/19* | (2006.01) |
| *F24F 11/00* | (2018.01) |
| *G05B 15/02* | (2006.01) |
| *F24F 11/30* | (2018.01) |
| *G05D 23/00* | (2006.01) |
| *G05B 19/042* | (2006.01) |
| *G06F 8/65* | (2018.01) |

(52) U.S. Cl.
CPC ............. *G05B 19/042* (2013.01); *G06F 8/65* (2013.01); *G05B 2219/2614* (2013.01)

(58) Field of Classification Search
CPC .. F24F 11/30; F24F 11/62; F24F 11/58; F24F 2110/10; F24F 11/52; G05B 15/02
See application file for complete search history.

(56) References Cited

U.S. PATENT DOCUMENTS

| | | | |
|---|---|---|---|
| 9,766,645 B2 * | 9/2017 | Imes ...................... | G05B 15/02 |
| 10,302,329 B2 * | 5/2019 | Castillo ................ | G05B 19/042 |
| 10,506,015 B2 * | 12/2019 | Leising ................... | H04L 67/12 |

OTHER PUBLICATIONS

Lee et al., EPPY based Building Co-Simulation for Model Predictive Control of HVAC Optimization, 5 pages (Year: 2018).*

* cited by examiner

*Primary Examiner* — Thuy Dao
(74) *Attorney, Agent, or Firm* — Foley & Lardner LLP

(57) ABSTRACT

A method for updating heating, ventilation, or air conditioning (HVAC) devices is provided. The method includes receiving an update package at a first HVAC device of a plurality of HVAC devices via a network. The update package includes an identification of a plurality of device models and a plurality of software updates. The method includes determining that a device model for the first HVAC device is identified by the update package and in response to a determination that the device model for the first HVAC device is identified by the update package, extracting a first software update corresponding to the device model for the first HVAC device from the update package and installing the first software update on the first HVAC device. The method includes transmitting the first update package to a second HVAC device of the plurality of HVAC devices via the network.

20 Claims, 10 Drawing Sheets

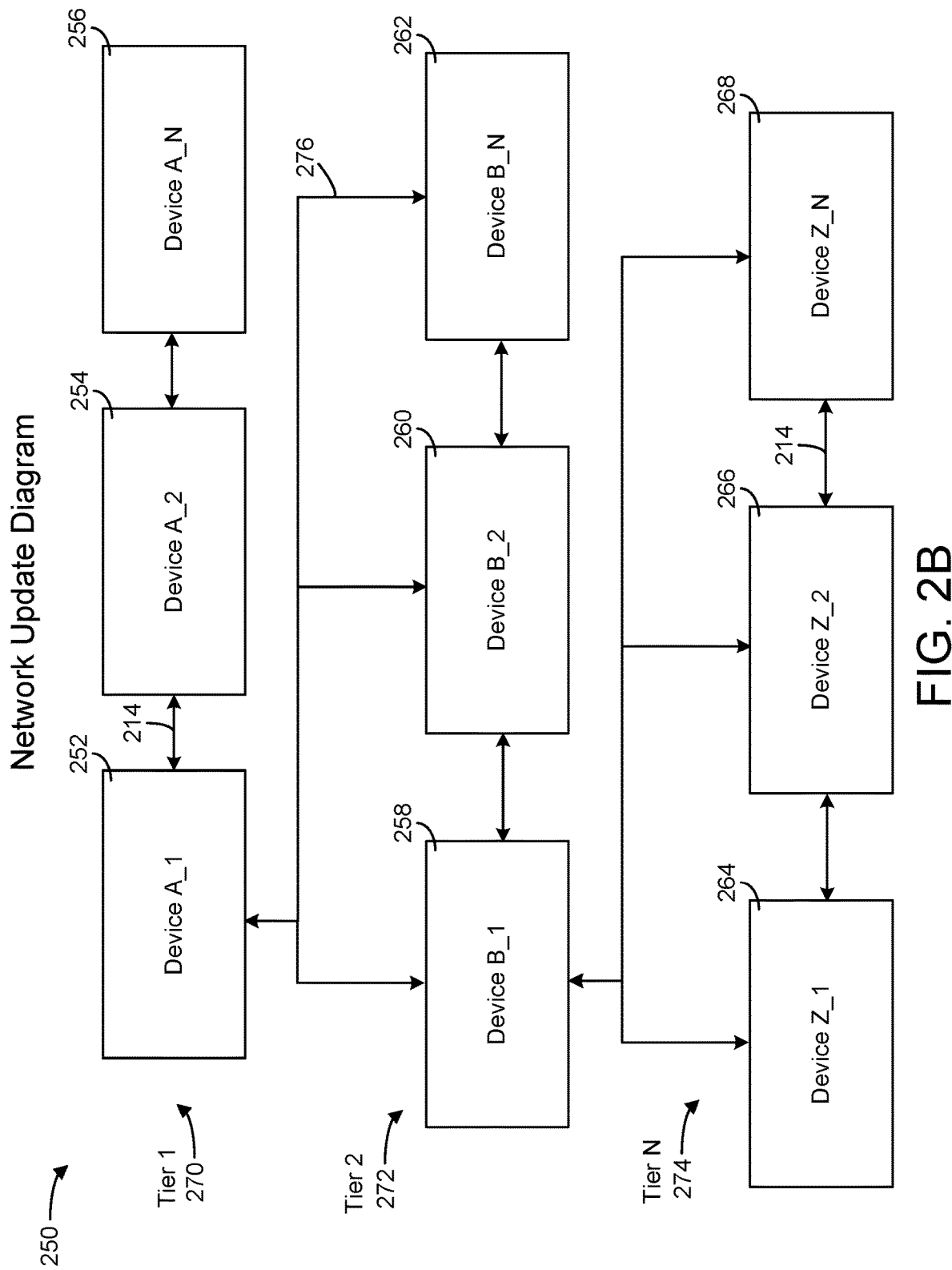

BUILDING MANAGEMENT SYSTEM WITH UPDATE ECOSYSTEM

CROSS-REFERENCE TO RELATED APPLICATIONS

This application claims from the benefit of U.S. Provisional Application 62/799,668, filed Jan. 31, 2019, incorporated herein by reference in its entirety.

BACKGROUND

The present disclosure relates generally to the field of heating, ventilation, and air conditioning (HVAC) control systems. HVAC control systems are generally used to monitor and control temperature, humidity, air flow, air quality, and/or other conditions within a building or building system. HVAC control systems typically include a plurality of measurement devices (e.g., temperature sensors, pressure sensors, flow sensors, etc.), control devices (e.g., chillers, boilers, air handling units, variable air volume units, etc.), and one or more controllers for receiving feedback from the measurement devices and providing a control signal to the control devices. Some HVAC control systems include a main controller and one or more auxiliary, or subordinate, controllers.

The present disclosure relates more particularly to systems and methods for automatically updating software, firmware, or configuration settings for devices in an HVAC control system through upload of an update package at a single access point in the system.

SUMMARY

One implementation of the present disclosure is a method for updating heating, ventilation, or air conditioning (HVAC) devices. The method includes receiving an update package at a first HVAC device of a plurality of HVAC devices via a network. The update package includes an identification of a plurality of device models and a plurality of software updates, each of the software updates corresponding to one of the plurality of device models. The method further includes determining that a device model for the first HVAC device is identified by the update package and in response to a determination that the device model for the first HVAC device is identified by the update package, extracting a first software update corresponding to the device model for the first HVAC device from the update package, installing the first software update on the first HVAC device, and transmitting the first update package to a second HVAC device of the plurality of HVAC devices via the network.

In some embodiments, transmitting the update package to the second HVAC device includes determining that a device model for the second HVAC device is identified by the update package, extracting the first software update corresponding to the device model for the second HVAC device, and transmitting the update package to a third HVAC device of the plurality of HVAC devices.

In some embodiments, transmitting the update package to the second HVAC device includes determining that a device model of the second HVAC device is different than the device model of the first HVAC device, extracting a second software update from the update package and installing the update on the second HVAC device, and transmitting the update package to a third HVAC device of the plurality of HVAC devices.

In some embodiments, the method further includes establishing device tiers within the plurality of HVAC devices, the device tiers comprising a first tier, a second tier, and a third tier, the HVAC devices in the first tier configured to control, at least in part, the HVAC devices in the second tier and the HVAC devices in the third tier, the second tier configured to control, at least in part, the HVAC devices in the third tier, wherein two or more HVAC devices within the first tier, second tier, or third tier have the same device models.

In some embodiments, the method further includes transmitting the update package from an HVAC device in the first tier to an HVAC device in the second tier, extracting the second software update from the update package and installing the update on the second HVAC device, and transmitting the update package to a third HVAC device of the plurality of HVAC devices.

In some embodiments, the method further includes connecting a first HVAC system in a first building to a network, connecting a second HVAC system in a second building to the network, the first HVAC system and second HVAC system comprising the plurality of HVAC devices, providing, via the network, a plurality of update packages to the first HVAC system and the second HVAC system, the plurality of update packages comprising the update package.

In some embodiments, the plurality of HVAC devices comprises various HVAC controllers configured to provide control signals to HVAC building equipment, wherein the update package comprises one or more software updates, installation updates, or configuration updates, the update package configured to update the operation of one or more of the plurality of HVAC devices.

Another implementation of the present disclosure is a building management system (BMS). The building management system includes an update package. The update package includes an identification of an update package version, an identification of a plurality of device models, and a plurality of software updates, each of the software updates corresponding to one of the plurality of device models. The BMS further includes a processing circuit including one or more processors and memory storing instructions that, when executed by the one or more processors, cause the one or more processors to perform operations including receiving the update package at a first HVAC device of a plurality of HVAC devices via a network, determining that a device model for the first HVAC device is identified by the update package; and in response to a determination that the device model for the first HVAC device is identified by the update package, extracting a first software update corresponding to the device model for the first HVAC device from the update package and installing the first software update on the first HVAC device and transmitting the first update package to a second HVAC device of the plurality of HVAC devices via the network.

In some embodiments, the processing circuit is further configured to, determine that a device model for the second HVAC device is identified by the update package, extract the first software update corresponding to the device model for the second HVAC device, and transmit the update package to a third HVAC device of the plurality of HVAC devices.

In some embodiments, the processing circuit is further configured to determine that a device model of the second HVAC device is different than the device model of the first HVAC device, extract a second software update from the update package and installing the update on the second HVAC device, and transmit the update package to a third HVAC device of the plurality of HVAC devices.

In some embodiments, the processing circuit is further configured to establish device tiers within the plurality of HVAC devices, the device tiers comprising a first tier, a second tier, and a third tier, the HVAC devices in the first tier configured to control, at least in part, the HVAC devices in the second tier and the HVAC devices in the third tier, the second tier configured to control, at least in part, the HVAC devices in the third tier, wherein two or more HVAC devices within the first tier, second tier, or third tier have the same device models.

In some embodiments, the processing circuit is further configured to transmit the update package from an HVAC device in the first tier to an HVAC device in the second tier, extract the second software update from the update package and installing the update on the second HVAC device, and transmit the update package to a third HVAC device of the plurality of HVAC devices.

In some embodiments, the processing circuit is further configured to connect a first HVAC system in a first building to a network, connect a second HVAC system in a second building to the network, the first HVAC system and second HVAC system comprising the plurality of HVAC devices, and provide, via the network, a plurality of update packages to the first HVAC system and the second HVAC system, the plurality of update packages comprising the update package.

In some embodiments, the plurality of HVAC devices comprises various HVAC controllers configured to provide control signals to HVAC building equipment, wherein the update package comprises various software updates, installation updates, or configuration updates, the update package configured to update the operation of one or more of the plurality of HVAC devices.

Another implementation of the present disclosure is a building management ecosystem for controlling heating, ventilation, or air conditioning (HVAC) systems across one or more buildings. The ecosystem includes a first HVAC system in a first building connected to a network and a second HVAC system in a second building to the network, the first HVAC system including a first plurality of HVAC devices and the second HVAC system including a second plurality of HVAC devices, a first device of the first plurality of HVAC devices including a processing circuit comprising one or more processors and memory storing instructions that, when executed by the one or more processors, cause the one or more processors to perform operations. The operations include receiving the update package at the first HVAC device of the first plurality of HVAC devices via the network, determining that a device model for the first HVAC device is identified by the update package, and in response to a determination that the device model for the first HVAC device is identified by the update package, extracting a first software update corresponding to the device model for the first HVAC device from the update package and installing the first software update on the first HVAC device, transmitting the first update package to a second HVAC device of the second plurality of HVAC devices via the network.

In some embodiments, the processing circuit is further configured to determine that a device model for the second HVAC device is identified by the update package, extract the first software update corresponding to the device model for the second HVAC device, and transmit the update package to a third HVAC device of the plurality of HVAC devices.

In some embodiments, the processing circuit is further configured to determine that a device model of the second HVAC device is different than the device model of the first HVAC device, extract a second software update from the update package and installing the update on the second HVAC device, and transmit the update package to a third HVAC device of the plurality of HVAC devices.

In some embodiments, the processing circuit is further configured to establish device tiers within the plurality of HVAC devices, the device tiers comprising a first tier, a second tier, and a third tier, the HVAC devices in the first tier configured to control, at least in part, the HVAC devices in the second tier and the HVAC devices in the third tier, the second tier configured to control, at least in part, the HVAC devices in the third tier, wherein two or more HVAC devices within the first tier, second tier, or third tier have the same device models.

In some embodiments, the processing circuit is further configured to transmit the update package from an HVAC device in the first tier to an HVAC device in the second tier, extract the second software update from the update package and installing the update on the second HVAC device, and transmit the update package to a third HVAC device of the plurality of HVAC devices.

In some embodiments, the processing circuit is further configured to provide, via the network, a plurality of update packages to the first HVAC system and the second HVAC system, the plurality of update packages comprising the update package.

BRIEF DESCRIPTION OF THE DRAWINGS

FIG. 2B is a block diagram of a network update diagram for devices in a building management system (BMS) which can be used to monitor and control the building and HVAC system of FIG. 1, according to some embodiments.

DETAILED DESCRIPTION

Before turning to the figures, which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Overview

Referring generally to the FIGURES, a building management system (BMS) with an update ecosystem is shown, according to some embodiments. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS described herein provides a system architecture that facilitates automatic updates of software, firmware, or configuration settings to all devices in a system upon upload of an update package at a single access point in the system. Existing systems often require manual upload of updates to every device in the system, or in some cases, every device type in the system. Thus, existing processes are time-consuming and prone to error, since a great amount of manual effort is expended. By providing a system architecture in which every device is able to push updates to every other device, regardless of device type, it is possible to greatly reduce the manual effort required to update an entire system. In addition, because any device in the BMS may serve as the entry point for upload of the update package, a technician or building supervisor may utilize an easily accessible entry point for upload (e.g., a thermostat mounted on a wall rather than a controller mounted behind ceiling panels), minimizing building disruption during the update process.

Building and HVAC System

Figure 1:
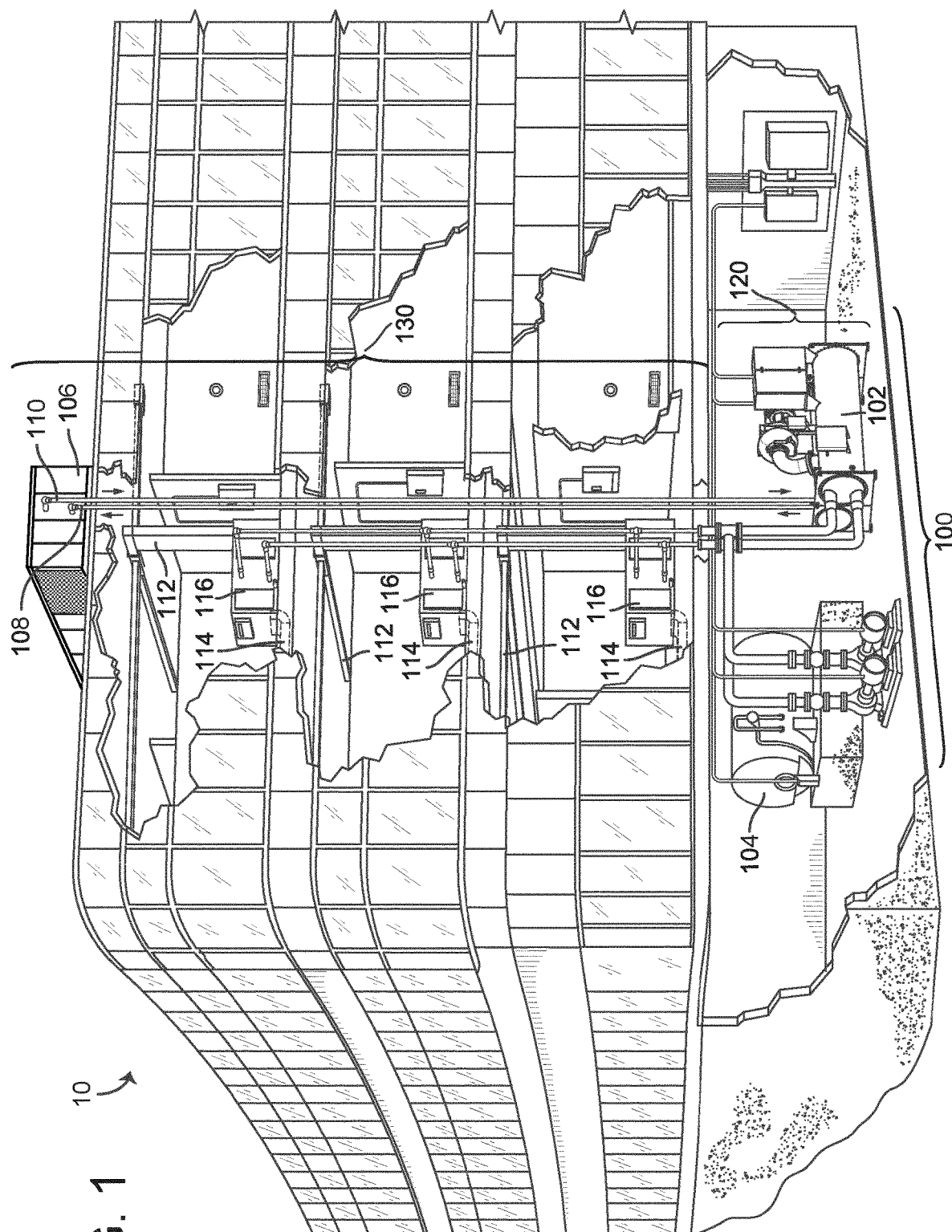
FIG. 1 is a drawing of a building equipped with a heating, ventilating, and air conditioning (HVAC) system, according to some embodiments.

Referring now to FIG. 1, an exemplary building and HVAC system in which the systems and methods of the present disclosure can be implemented is shown, according to an exemplary embodiment. In FIG. 1, a perspective view of a building 10 is shown. Building 10 is served by a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Building Management System with Software Update Ecosystem

Figure 2A:
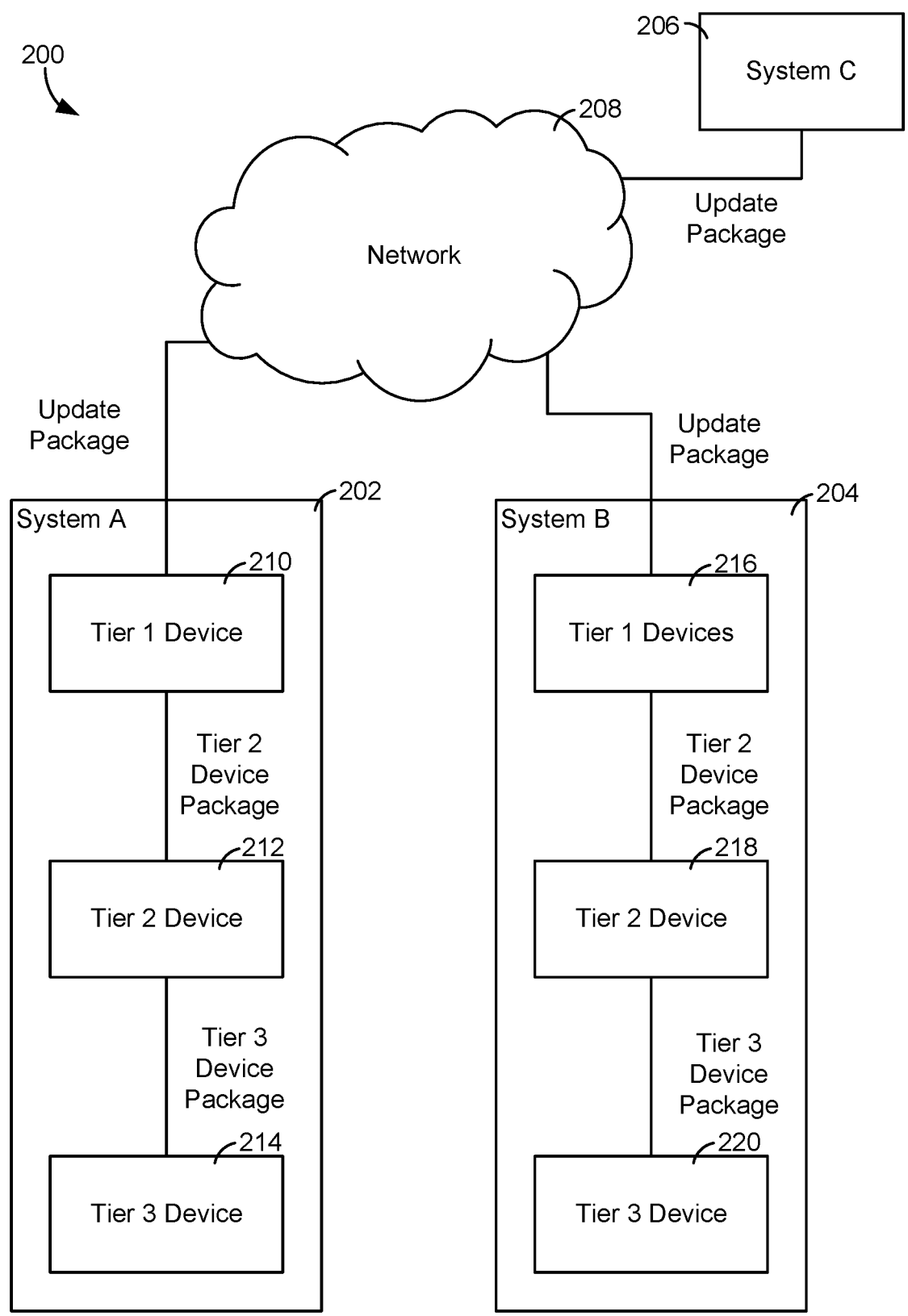
FIG. 2A is a block diagram of an ecosystem network that spans multiple buildings, according to some embodiments.

Referring now to FIG. 2A, an ecosystem 200 is shown. In some embodiments, ecosystem 200 includes various systems that may or may not be located in a variety of buildings. Ecosystem 200 may also include one or more networks that allow for communications between ecosystem 200 and various building management systems. Ecosystem 200 may be configured to receive one or more software packages from a source (e.g., via an off-premise server, etc.) and provide the software update to various HVAC devices within ecosystem 200. Ecosystem 200 is shown to include system A 202, system B 204, system C 206, and network 208.

In some embodiments, ecosystem 200 spans several buildings and is not limited to HVAC system 100. For example, system A 202 may be located in a first building, and system B 204 may be located in a second building. The devices within each system may both receive software packages via network 208. In some embodiments, network 208 is a cloud network and various software packages are provided and stored thereon. In other embodiments, network 208 is a local area network (LAN) or variations thereof (e.g., WLAN, HAN, SAN). In other embodiments, network 208 may be any known area network (AN) type, including: cloud (IAN), wide (WAN), campus (CAN), local (LAN), near-me (NAN), or the Internet.

System A 202 (and similarly systems 204-206) may be configured to receive a software package (e.g., updates, configurations, installations, etc.) from network 208 and provide the software package to various devices within system 202. In some embodiments, system A 202 can receive updates in the same or similar process as described in U.S. patent application Ser. No. 15/481,174 filed Mar. 6, 2017, the entire disclosure of which is incorporated by reference herein. System 202 is shown to include tier 1 device 210, tier 2 device 212, and tier 3 device 214. The term "tier" with reference to devices 210-214 refers to the hierarchical level of the devices within system 202 and is described in greater detail below. Devices 210-214 may be any HVAC device within building 10, and may include various processing circuitry for receiving software packages.

For example, device 210 may be a thermostat controller configured to control various HVAC equipment to reach one or more temperature setpoints. In some embodiments, device 210 may be a TEC Thermostat Controller as sold by Johnson Controls, Inc. In other embodiments, device 210 and any other HVAC device described herein may be a zone coordinator, rooftop unit (RTU) controller, or any other device within HVAC system 100. Device 210 may receive a complete software package from network 208 and update accordingly using the software package. Finally, device 210 may provide a portion of the software package necessary to update device 212-214 to device 212. In an exemplary embodiment, device 210 is a thermostat controller configured to receive a new update package. Device 210 receives the update package from network 208 and updates accordingly. Device 212 is not the same device (i.e., device 212 is not a TEC thermostat controller, but may be a flow controller for an HVAC valve, etc.) and thus requires a different portion of the update package. Device 210 may then only provide the necessary components for updating device 212 to device 212, which may be a portion of the update package originally received by network 208.

The process of selectively providing portions of the update package to various devices within system 202 may be performed vertically (e.g., between different tiers of device types) or horizontally (e.g., within the same tier of device type). Vertically updating, as shown in FIG. 2A, includes a high level device (e.g., device 210, etc.) receiving an entire update package and selectively providing the portions of the update package necessary to update the lower-tier devices (e.g., device 212, device 214, etc.). Conversely, horizontally updating includes devices receiving an update package and providing the update package to similar devices. For example, device 210 may be a thermostat controller that receives an update. Device 210 may update accordingly and then send the update to other thermostat controllers within system 202. This type of updating between similar devices (i.e., horizontal updating) is described in greater detail with reference to FIG. 2B. Systems 204-206 may be similar in functionality to system 202. Similarly, devices 216-220 may be similar in functionality to devices 210-214.

Referring now to FIG. 2B, a block diagram of a building management system (BMS) 250 is shown, according to an exemplary embodiment. In some embodiments, BMS 250 is incorporated within ecosystem 200, as shown in FIG. 2A. For example, all of the devices within BMS 250 (e.g., device A_1 252, device Z_N 268, etc.) may be part of a single system within ecosystem 200 (e.g., system A 202). A BMS is, in general, a network of devices configured to control, monitor, and manage equipment in or around a building or building area. In some embodiments, BMS 250 may manage HVAC system 100 depicted in FIG. 1. In some embodiments, BMS 250 is similar to system 202 shown in FIG. 2A. BMS 250 is shown to include multiple devices arranged in a tiered structure. For example, BMS 250 is shown to include tier 1 devices 270, tier 2 devices 272, and tier N devices 274. Although BMS 250 is depicted as including three tiers, BMS 250 could include any number of tiers.

Tier 1 270 may include device A_1 252, device A_2 254, and device A N 256. Tier 2 272 may include device B_1 258, device B_2 260, and device B N 262, while tier N 274 may include device Z_1 264, device Z_2 266, and device Z_N 268. Although each tier 270-274 is shown to include three devices, each tier 270-274 may include any number of HVAC devices. In some embodiments, HVAC devices located on the same tier are known as a trunk.

In various embodiments, devices 252-268 may be sensors, actuators, thermostats, economizers, rooftop units (RTUs), expansion input/output (IO) modules, or any other suitable HVAC equipment. In some embodiments, devices 252-268 may further include primary and subordinate controllers. HVAC devices 252-268 may communicate along the same trunk or between tiers using communications bus 276. In some embodiments, communications bus 276 is a sensor actuator (SA) communications bus, and communications over bus 276 are sent via BACnet master slave token passing (MSTP) protocol.

In some embodiments, devices on a lower tier (e.g., tier N 274) receive control signals from a device on a higher tier. In addition, a device on a higher tier may receive data from devices on a lower tier. For example, tier 2 272 can provide device A_1 252 with temperature measurements from temperature sensors, equipment on/off states, equipment operating capacities, and/or any other information that can be used by device A_1 252 to monitor or control a variable state or condition within a building.

Figure 3A:
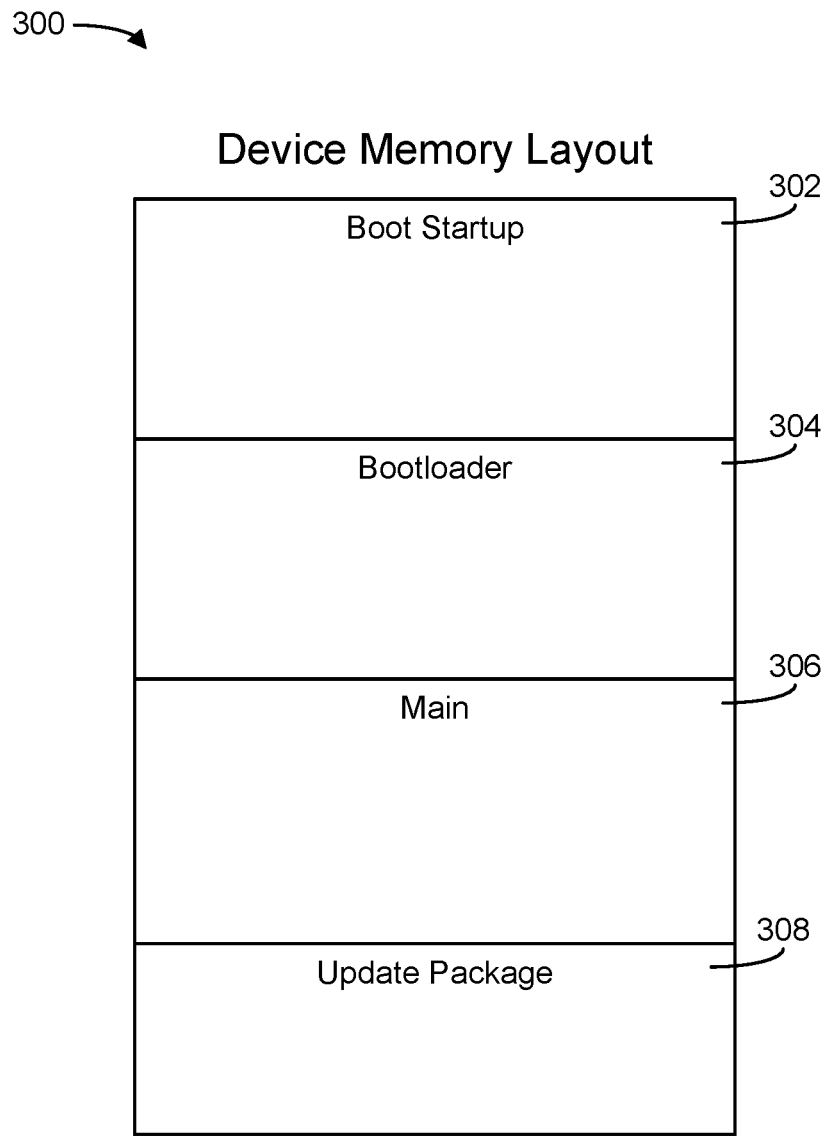
FIG. 3A is a block diagram illustrating the firmware architecture of HVAC devices, according to some embodiments.

Referring now to FIG. 3A, a block diagram 300 of the firmware architecture for an HVAC device is depicted according to one embodiment. Diagram 300 shows the device memory layout for an HVAC device and includes boot startup 302, bootloader 304, main 306, and update package 308. In some embodiments, the HVAC device may be any of the devices 252-268 described above with reference to FIG. 2B, or any other device described herein. Boot startup code 302 is responsible for initializing the device hardware and transitioning into bootloader code 304 or main code 306. If boot startup code 302 detects that the device contains no main code 306, or that main code 306 is corrupted, the device transitions into bootloader code 304.

In some embodiments, the primary function of bootloader code 304 is to manage the download of main code 306. Main code 306 can be the firmware configured to control the device's major functions. A device running bootloader code 304 (i.e., either in the process of or awaiting download of main code 306) may have a status attribute of CODE_DOWNLOAD_REQUIRED or CODE_DOWNLOAD_IN_PROGRESS. A device running bootloader code 304 may have no main code 306 and consequently may act as an MSTP slave device (i.e., a device that acts subordinate to a device on a higher tier). Update package 308 may be configured to be part of the firmware for an HVAC device, as shown in FIG. 3A. In some embodiments, update package 308 is received by an HVAC device and the update package is downloaded into memory.

Figure 3B:
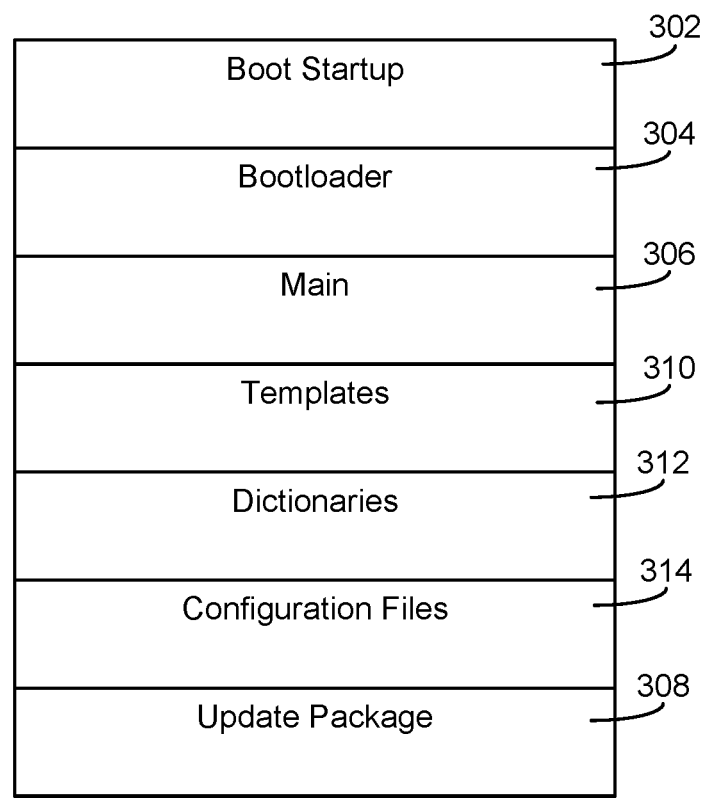
FIG. 3B is a block diagram illustrating the firmware architecture of HVAC devices, according to some embodiments.

Referring now to FIG. 3B, a diagram 300 for a device memory layout is shown, according to another embodiment. Diagram 300 is shown to include templates 310, dictionaries 312, and configuration files 314. Templates 310 may store various templates relating to ecosystem 200 and the devices therein. For example, templates 310 may store templates of various operational data relating to devices 252-256.

Dictionaries 312 may store definitions related to various HVAC equipment in ecosystem 200. In some embodiments, dictionaries 312 stores various operational data relating to specific HVAC devices within HVAC system 100. For example, dictionaries 312 may receive temperature data relating to a chiller plant recovery system within system 100.

Dictionaries 312 may then provide operational data, definitions, equipment objects, or any other type of modeling data to equipment model 418.

Configuration files 314 may implement the parameters and initial settings for various programs and/or applications stored on various HVAC devices or received via network 208. Configuration files may be implemented by a control application 422, a background download network object 444, or any other component within the processing circuitry of a device such as HVAC device 402, as described in detail with reference to FIGS. 4A-B.

Figure 4A:
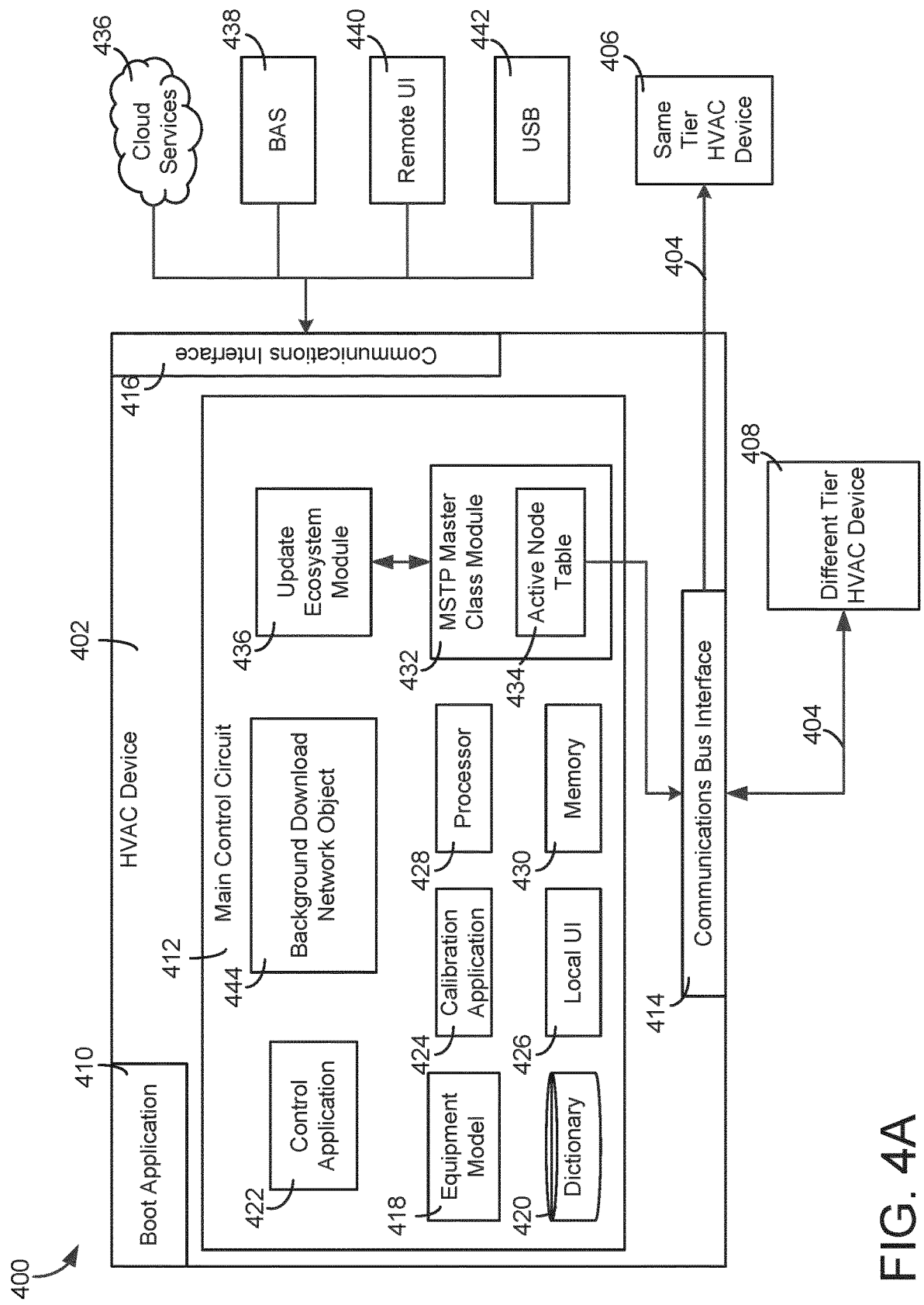
FIG. 4A is a block diagram illustrating an HVAC device that can be utilized in the BMS network of FIG. 2B, according to some embodiments.

Referring now to FIG. 4A, a block diagram of a BMS 400 is shown, according to an exemplary embodiment. In some embodiments, BMS 400 incorporates portions of BMS 250, ecosystem 200, and/or diagram 300. BMS 400 is shown to include HVAC device 402. HVAC device 402 may be any of the HVAC devices 252-256, 258-262 or any other HVAC device described herein. HVAC device 402 is shown to include boot application 410, main control circuit 412, communications bus interface 414, and communications interface 416.

Figure 4B:
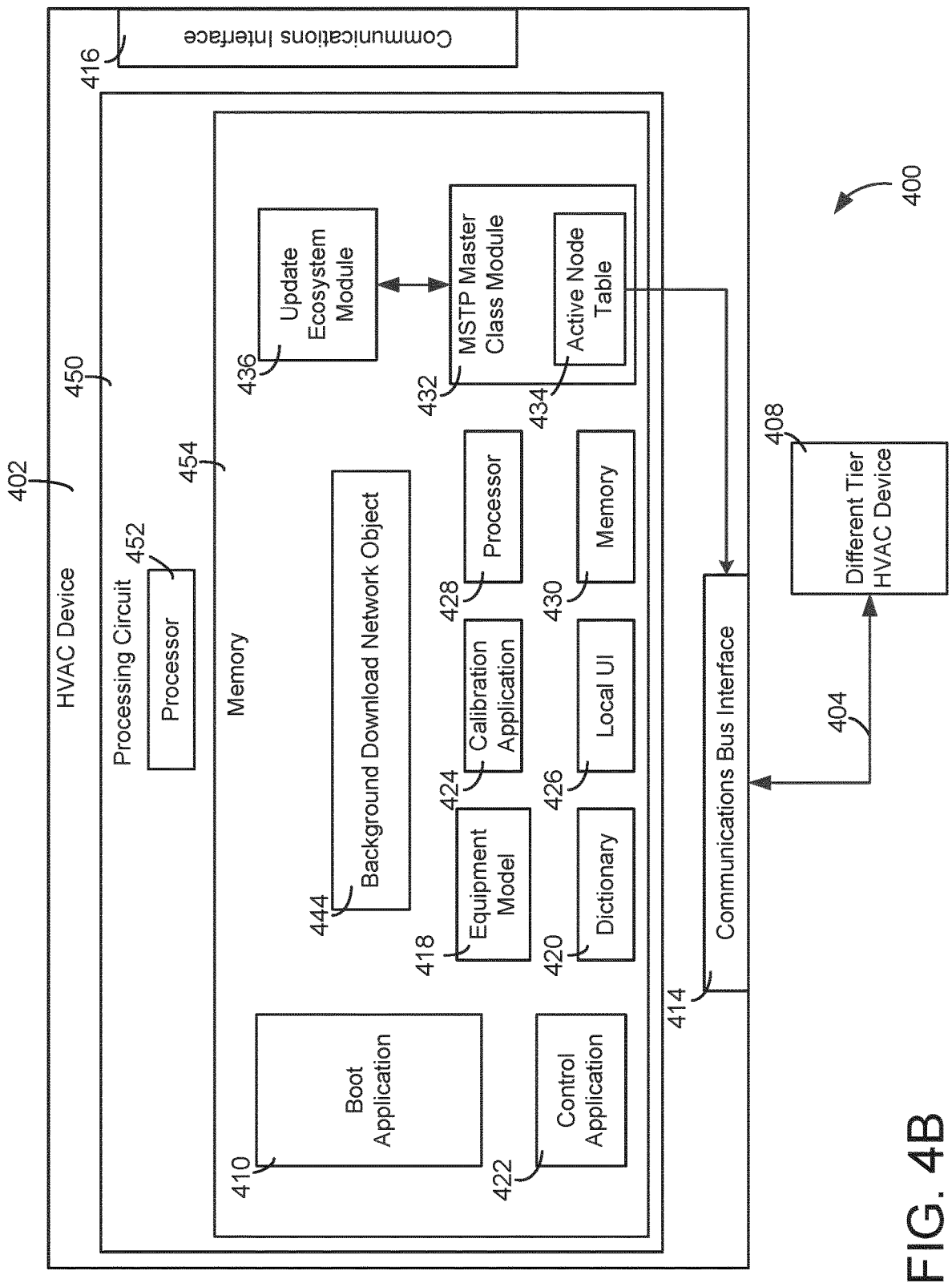
FIG. 4B is a block diagram illustrating an HVAC device that can be utilized in the BMS network of FIG. 2B, according to some embodiments.

Boot application 410 may be configured to act as a preliminary set of instructions for a processing device prior to standard operation. Boot application 410 may contain code used to initialize the hardware of HVAC device 402. In some embodiments, boot application 410 may include a bootloader configured to run prior to running the system operating system. In various embodiments, the bootloader may be the first process that runs immediately after an HVAC device has booted on. The functionality of bootloaders for HVAC device 402 is described in greater detail with reference to FIG. 3A above. Boot application 410 may be included with the processing circuitry of HVAC device 402, as shown in FIG. 4B.

Communication interfaces 414, 416 can facilitate communications between HVAC device 402 and external applications (e.g., different tier HVAC device 408, cloud services, same tier HVAC device 406, etc.) for allowing user control, monitoring, and adjustment to HVAC device 402. Interfaces 414, 416 can be or include wired or wireless communications interfaces (e.g., jacks, antennas, transmitters, receivers, transceivers, wire terminals, etc.) for conducting data communications with building subsystems or other external systems or devices. In various embodiments, communications via interfaces 414, 416 can be direct (e.g., local wired or wireless communications) or via a communications network 208 (e.g., a WAN, the Internet, a cellular network, etc.) or other communications network (e.g., cloud services 436). For example, interfaces 414, 416 can include an Ethernet card and port for sending and receiving data via an Ethernet-based communications link or network. In another example, interfaces 414, 416 can include a Wi-Fi transceiver for communicating via a wireless communications network. In another example, one or both of interfaces 414, 416 can include cellular or mobile phone communications transceivers. In one embodiment, communications interface 416 is a wireless communications interface and interface 414 is an Ethernet interface. In other embodiments, both communications interface 414 and BMS interface 416 are Ethernet interfaces or are the same Ethernet interface. In some embodiments, interfaces 414, 416 are the same interface. In various embodiments, communications interfaces 414, 416 may include wired or wireless connections to the external devices using a variety of communications protocols (e.g., Ethernet, Wi-Fi, BAS communications bus, Bluetooth, ZigBee, BACnet).

In some embodiments, communications bus interface 414 is configured to provide and receive communications via communications bus 404. Interface 414 may communicate with different tier HVAC device 408. For example, HVAC device 402 may be part of "tier 1" devices, as shown in FIG. 2B. Via communications bus interface 414, HVAC device 402 may communication with another device in "tier 1," such as device A_2 254 as shown in FIG. 2B. In some embodiments, communications interface 416 is configured to provide and receive communications to various external applications, such as cloud services 436, BAS 438, remote UI 440, and USB 442.

In some embodiments, HVAC device 402 is coupled via communications bus 404 to multiple other HVAC devices 406, 408 located on the same tier as HVAC device 402 (i.e., HVAC device 406) or a higher or lower tier than HVAC device 402 (i.e., HVAC device 408) and communicates via either of the interfaces 414, 416. Communications bus 404 may be the same as communications bus 214 in BMS 250 and may permit communications and the transfer of update packages between devices 402, 406, and 408. As described above, in some embodiments, communications bus 404 is a sensor actuator (SA) communications bus, and communications over the bus are sent via BACnet master slave token passing (MSTP) protocol. In other embodiments, communications are sent using a different type of communications bus and/or using a different type of communications protocol. For example, if HVAC device 402 is a primary controller, a field controller (FC) communications bus may permit device 402 to connect with other primary controllers and with subordinate controllers. Communications protocols which can be used by communications bus 404 include, for example, BACnet IP, BACnet MSTP, CAN, Modbus, USB, Firewire, UART, SPI, RS-485, etc.

Main control circuit 412 is shown to include equipment model 418, dictionary 420, control application 422, calibration application 424, local UI 426, processor 428, memory 430, MSTP master class module 432, background download network object 444, and update ecosystem module 436. Main control circuit 412 may be the primary processing circuitry for implementing various applications (e.g., boot application 410 (not shown), calibration application 424, etc.) within HVAC device 402.

Equipment model 418 may be configured to define equipment object attributes, and view definitions, schedules, trends, and the associated value objects for HVAC device 402 (e.g., analog value, binary value, multistate value, etc.) that are used for integration with other systems. For example, equipment model 418 may receive model data (e.g., historical data, training data, etc.) for the purposes of generating a standard operating procedure for various HVAC devices.

Dictionary 420 may be configured to store definitions related to various HVAC equipment in system 400. In some embodiments, dictionary 420 stores various operational data relating to specific HVAC devices within HVAC system 100. For example, dictionary 420 may receive temperature data relating to a chiller plant recovery system within system 100. Dictionary 420 may then provide operational data, definitions, equipment objects, or any other type of modeling data to equipment model 418.

Control application 422 may be configured to control the main functions of HVAC device 402. In some embodiments, control application 422 is or includes a set of instructions for operating HVAC device 402. In other embodiments, control application 422 is or includes the application for controlling the receiving, processing, and transmitting of various software packages received for updating. For example, HVAC device 402 may receive a software package for updating HVAC device 402. Control application 422 may, upon HVAC device 402 receiving the package, update the HVAC device accordingly and transmit the package to other devices (e.g., different tier HVAC device 408, same tier HVAC device 406). Calibration application 424 may be configured to calibrate HVAC device 402. In some embodiments, calibration application 424 is incorporated partially or entirely into control application 422.

Local User Interface (UI) 426 may be configured to provide information to a display (e.g., screen, monitor, phone, etc.) such that a user is capable of interacting with the display to view information and, in some instances, provide instructions via the interface. Local UI may include the processing for generating the interface, the interface itself, or both. In some embodiments, local UI 426 is a display screen on the exterior of the device configured to provide various users (e.g., building technicians, etc.) with the important information regarding HVAC device 402. In some embodiments, local UI 426 displays operational data (e.g., operating voltage, speed, efficiency, current load, voltage load, etc.) to a display.

Update ecosystem module 436 may be configured to perform various software, firmware, and configuration update functions. In some embodiments, update ecosystem module 436 can be configured to identify an update package, determine whether the update package includes a software, firmware, or configuration settings update for the HVAC device 402, determine whether the HVAC device 402 has sufficient space to install the update, extract the update from the update package, and determine how to transmit the update package to other devices within the tiered network hierarchy. Update ecosystem module 436 can be communicably coupled to MSTP master class module 432 within main control circuit 412. In some embodiments, MSTP master class module 432 manages an active node table 434 and is configured to manage communications between active node table 434 and the other components of main control circuit 412. Active node table 434 can provide status information for devices communicating between tiers or on a particular trunk level. For example, active node table 434 can provide status information for any devices connected that communicate on communications bus 404 using the MSTP master protocol. Each of the devices 402, 406, 408 may have a unique device identifier that may be used by active node table 434 to identify devices communicating on communications bus 404. In some embodiments, the unique device identifier is a MAC address. Update ecosystem module 436 is described in greater detail with reference to FIG. 7.

Background download network object 444 may be configured to monitor for various software packages that are intended for HVAC device 402. For example, a software update package may be transmitted to HVAC device 402. Background download network object 444 may monitor for a software update package and, upon finding a software update package for HVAC device 402, provide instructions to receive the package and/or update accordingly. In some embodiments, background download network object 444 may periodically (e.g., once a day, once every 12 hours, etc.) check network 208 for any new software update packages that may be required to update device 402.

Various applications within main control circuit 412 (e.g., control application 422, background download network object 444), either alone or in combination, may allow received software update packages to be automatically received and installed, without the need for a user to manually install the package. Additionally, the process of various devices within system 400 updating with the selective packages intended for each particular device may be done automatically (i.e., self-propagating).

Referring now to FIG. 4B, another embodiment of system 400 is shown, according to an exemplary embodiment. HVAC device 402 is shown to include processing circuit 450 including a processor 452 and memory 454. Processing circuit 450 can be communicably connected to communications bus interface 414 and/or communications interface 416 such that processing circuit 450 and the various components thereof can send and receive data via interfaces 414, 416. Processor 452 can be implemented as a general purpose processor, an application specific integrated circuit (ASIC), one or more field programmable gate arrays (FPGAs), a group of processing components, or other suitable electronic processing components. Processor 452 may be identical or substantially similar to processor 428.

Memory 454 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 454 can be or include volatile memory or non-volatile memory. Memory 454 can include database components, object code components, script components, or any other type of information structure for supporting the various activities and information structures described in the present application. According to an example embodiment, memory 454 is communicably connected to processor 452 via processing circuit 404 and includes computer code for executing (e.g., by processing circuit 450 and/or processor 452) one or more processes described herein. Memory 454 may be identical or substantially similar to memory 430.

In some embodiments, main control circuit 412 as shown in FIG. 4A includes various components (e.g., equipment model 418, background download network object 444, etc.) that may be located on the device's memory (e.g., memory 430) or may be received from an external source (e.g., off-premises servers, on-premises servers, cloud networks etc.). Conversely, HVAC device 402 as shown in FIG. 4B includes processing circuit 450 including a processor 452 and memory 454, wherein the memory 454 includes various components (e.g., equipment model 418, background download network object 444, etc.). Memory 454 is located on HVAC device 402 and, as such, stores and implements the various applications and components therein.

Figure 5:
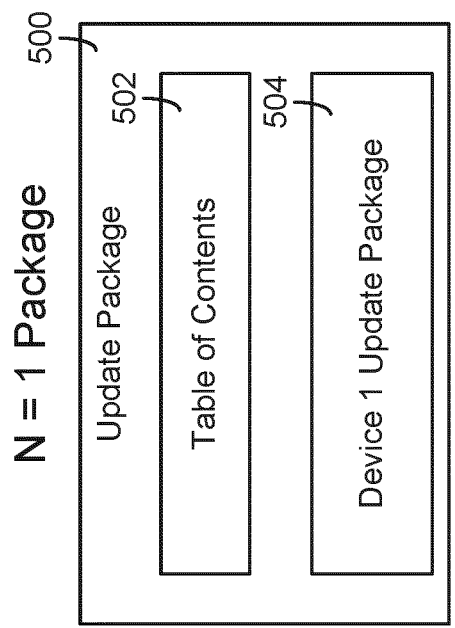
FIG. 5 is a block diagram illustrating an update package that can be utilized in the BMS network of FIG. 2B, according to some embodiments.
Figure 6:
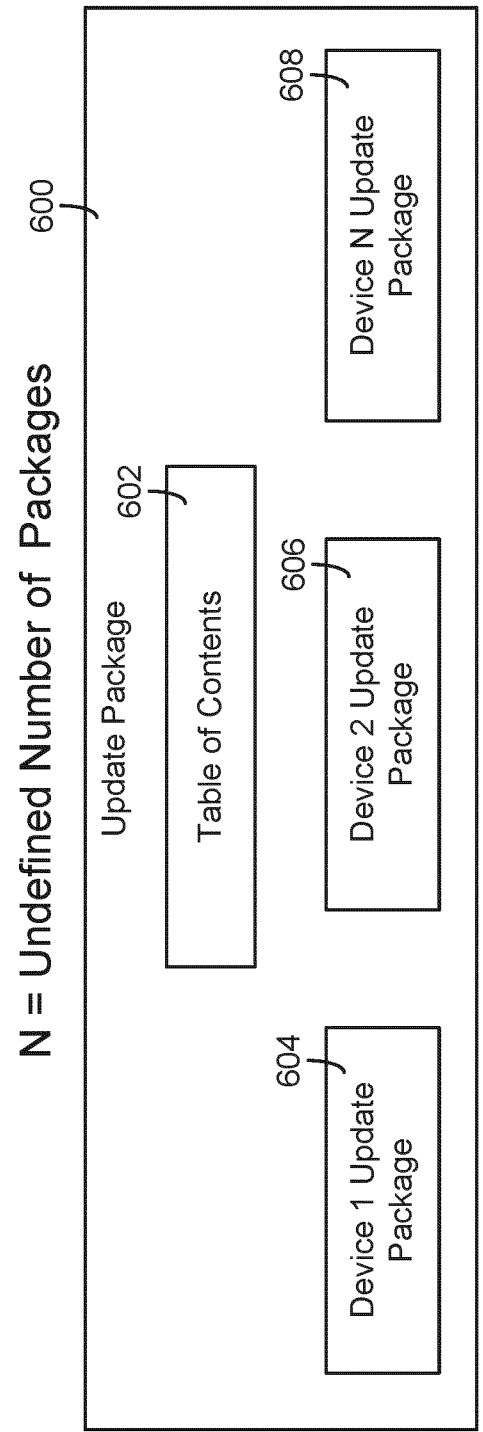
FIG. 6 is a block diagram illustrating another update package that can be utilized in the BMS network of FIG. 2B, according to some embodiments.

Turning now to FIGS. 5-6, block diagrams of embodiments of update packages 500 and 600 are depicted, according to exemplary embodiments. Update package 500, as shown in FIG. 5, may include a single device model update, while software update package 600, as shown in FIG. 6, may include multiple device model updates. Update package 500 is shown to include a table of contents 502 and a device 1 update package 504.

Table of contents 502 may store identifying data for the update package 500. For example, table of contents 502 may include a version number for the update package, the device model number eligible for an update, the update version number, and the update package size. In some embodiments, background download network object 444 may receive information from table of contents 502 to determine if the update package 500 is intended for HVAC device 402. Table of contents 502 may be observed and/or analyzed by applications within HVAC device 402 (e.g., control application 422, background download network object 444, etc.) to determine if and/or how HVAC device 402 should be updated.

Device 1 update package 504 may include one or more updates (e.g., software, firmware, configuration settings) for a particular device (e.g., HVAC device 402, a particular device model number, etc.). For example, package 504 may include firmware to update the main code of the device (e.g., main code 306, described above with reference to FIG. 3A).

Update package 600 is shown to include table of contents 602, device 1 update package 604, device 2 update package 606, and device N update package 608. Table of contents 602 may be substantially similar to table of contents 502, except that table of contents 602 may include identifying data for multiple devices (e.g., device model numbers) eligible for upgrades, multiple update package version numbers, and multiple update package sizes. The version number of the update package 600 may be incremented each time one of the version numbers of the device update packages is incremented.

Device 1 update package 604 may include an update for a first device (e.g., a first device model number), device 2 update package 606 may include an update for a second device (e.g., a second device model number), and device N update package 608 may include an update for a third device (e.g., a third device model number). Although update package 600 is depicted as including three update packages 604-608, package 600 may include any number of update packages desired. For example, in some embodiments, package 600 may include an update package for every device in the network (e.g., each of devices 252-268 of BMS network 200).

In some embodiments, the device update packages 604-608 may remain at the intended device when the package arrives, while other device update packages may stay within and be further transmitted as part of the update package for other HVAC devices. For example, update package 600 may arrive at device 1. Device 1 update package 604 is implemented in device 1 and device 1 is updated. Update package 600 may then, absent device 1 update package 604, be transmitted to device 2 for updating. Device 2 may update with device 2 update package 606, and so on.

For the sake of convenience, the present disclosure details various update packages that are generally related to updating a device, but there are various other software packages that may be transmitted to various HVAC devices. For example, a software update package may include protocol information that may allow the HVAC devices to communicate via an updated protocol method. In other embodiments, the software update package may include new software that must be installed on the various HVAC devices.

Figure 7:
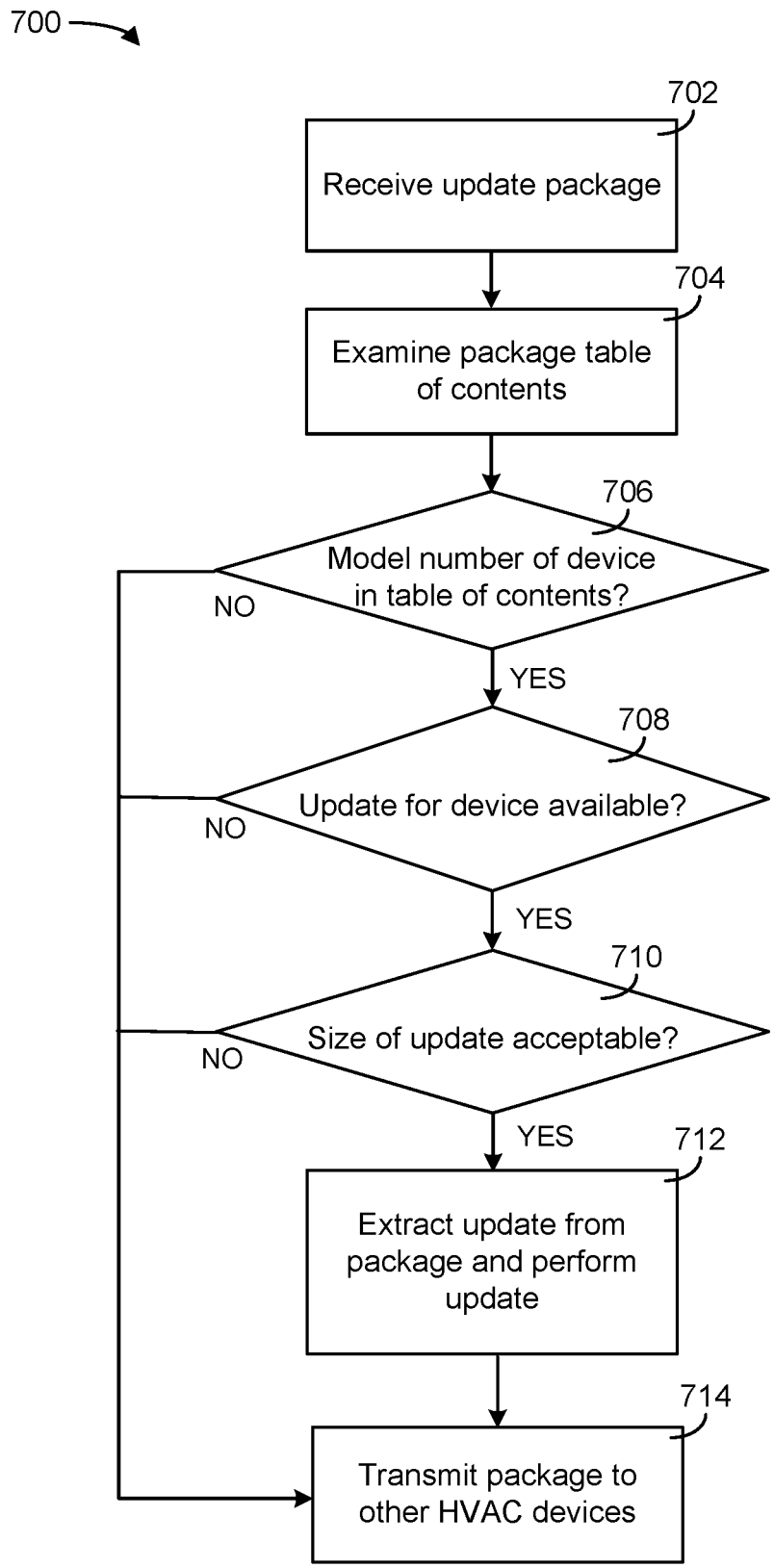
FIG. 7 is a flow diagram illustrating a process for updating HVAC device firmware in the BMS network of FIG. 2B, according to some embodiments.

Referring now to FIG. 7, a flowchart of a process 700 for updating HVAC devices is shown, according to an exemplary embodiment. Process 700 can be performed by one or more components of BMS 250 and/or BMS 400. In some embodiments, process 700 is performed by update ecosystem module 436 of main control circuit 412 in communication with MSTP master class 432 and active node table 434 as described with reference to FIG. 4A. In some embodiments, the process of discovering other devices in the BMS network through monitoring of an active node table is the same or similar to the processes described in U.S. patent application Ser. No. 15/179,894 filed Jun. 10, 2016 ("Building Management System with Automatic Equipment Discovery and Equipment Model Distribution") and U.S. patent application Ser. No. 15/397,690 filed Jan. 3, 2017 ("Building Management System with Automatic Equipment Discovery and Function Extension"). The entire disclosure of each of these applications is incorporated by reference herein.

Process 700 is shown to include the HVAC device receiving an update package (step 702). For example, the HVAC device 402 may receive the update package via the communications bus interface 414 from an HVAC device on the same tier as device 402 (e.g., HVAC device 406) or a device located on a higher or lower tier (e.g., HVAC device 408). In other embodiments, the update package is received via communications interfaces 416 using cloud services 436, BAS 438, remote UI 440, or USB device 442. In still further embodiments, the update package is received using another method (e.g., near field communication (NFC)). The update package may be identical or substantially similar to update packages 500, 600, described above with reference to FIGS. 5 and 6.

Upon receiving the update package, the update ecosystem module 436 of the HVAC device 402 examines the table of contents of the update package (step 704). As described above, the table of contents may store identifying data for the upgrade package including, but not limited to, the version number of the update package, the device model numbers eligible for updates, update version numbers, and the sizes of the updates.

At step 706, the HVAC device 402 determines if the model number of the device is included in the table of contents of the update package. For example, if HVAC device 402 is a Model Number 1000 thermostat device and the table of contents for the update package does not include an entry for a Model Number 1000 thermostat device, process 700 may proceed to step 714, described in greater detail below. However, if the table of contents does include the device model number of HVAC device 402, process 700 proceeds to step 708.

At step 708, the HVAC device 402 determines whether an update for the device is available. In some embodiments, the HVAC device 402 determines whether an update is available based on the version data stored in the table of contents. For example, if HVAC device 402 currently has firmware version 1.0 installed and the table of contents entry indicates that the update package also contains firmware version 1.0, process 700 may proceed to step 714. However, if the table of contents indicates that an update is available (i.e., the update package contains firmware version 1.1), process 700 proceeds to step 710.

At step 710, the HVAC device 402 determines whether the size of the update is acceptable. In other words, even if the HVAC device 402 determines that the update package contains an update applicable to the HVAC device 402, the HVAC device 402 may refrain from extracting and installing the update if the device contains insufficient available memory (e.g., memory 430). If insufficient memory is available, process 700 proceeds to step 714. However, if sufficient memory is available, process 700 proceeds to step 712.

Upon determining that the size of the update is acceptable, the HVAC device 402 proceeds to extract the relevant update for the model device number from the package and install the update (step 712). In some embodiments, step 712 further includes verification of the update package, using any suitable method. For example, the verification method may be a cyclic redundancy check (CRC) or signature verification. In some embodiments, the HVAC device 402 installs the updates immediately upon extraction from the update package. In other embodiments, the HVAC device 402 may store the update until a later installation period. The installation period may be scheduled or triggered by a certain event (e.g., a technician entering a command to update device firmware). In some embodiments, groups of devices within the BMS network may be configured to install updates at the same time (e.g., overnight or a time in which the building is unoccupied), in order to minimize building repercussions or loss of BMS control. In various embodiments, devices may be grouped according to installation location, MAC address, tier level, or any other desired criteria.

Process 700 concludes at step 714 as the HVAC device 402 transmits the update package to other HVAC devices (e.g., devices 252-268 of FIG. 2B, devices 406 and 408 of FIG. 4A). HVAC device 402 may be configured to transmit the update package to a higher tier device, a lower tier device, or a device on the same tier as the HVAC device 402. In some embodiments, the HVAC device 402 may transmit the update package to the devices of one or more tiers simultaneously. In still further embodiments, the HVAC device 402 may only transmit the update package upon satisfaction of a trigger condition (e.g., a determination that a receiving device has sufficient memory to receive the update package, a determination that a new device has been installed in the network).

HVAC device 402 may operate in several modes during step 714. In some embodiments, HVAC device 402 operates in a broadcast transmission mode. In the broadcast transmission mode, HVAC device 402 transmits the entire update package to a higher tier device, a lower tier device, and/or a device on the same tier as the HVAC device 402. In other embodiments, the HVAC device 402 operates in a targeted transmission mode. In the targeted transmission mode, the HVAC device 402 only transmits a portion of the update package to a higher tier device, a lower tier device, and/or a device on the same tier as the HVAC device 402. For example, if the update package is update package 600 depicted in FIG. 6, when operating in the targeted transmission mode, the HVAC device 402 may transmit a modified update package 600 to a lower tier device consisting only of the table of contents 602, the device 1 update package 604, and the device N update package 608. In other words, the HVAC device 402 may refrain from transmitting the device 2 update package 606 to a lower tier if the HVAC device 402 detects that the lower tier does not include a device having a model number corresponding with the device 2 update package 606.

In some embodiments, the HVAC device 402 may operate in both the broadcast mode and the targeted mode. For example, the HVAC device 402 may transmit the entire update package to a higher tier device, while transmitting targeted update packages to a lower tier device or one or more devices on the same tier as HVAC device 402. In some embodiments, communications between devices on the same tier determine the transmission targets of the HVAC device 402. For example, one of the devices on the tier may act as the "master" device for the tier based on MAC address, operational time, or any other desired characteristic. Referring again to FIG. 2B, if the update package is first uploaded to device B_1 258 (i.e., the entry point device), device B_1 258 may transmit the entire update package to device B_2 260 (i.e., the designated master device for the tier). Device B_2 260 may then repeat steps 702-712 of process 700. Upon reaching step 714, master device B_2 260 may determine whether to transmit the entire update package or a modified subset of the update package to one or more devices (e.g., device B N 262) based on the detected versions of the devices, the detected available memory of the devices, or any other desired criteria.

Figure 8:
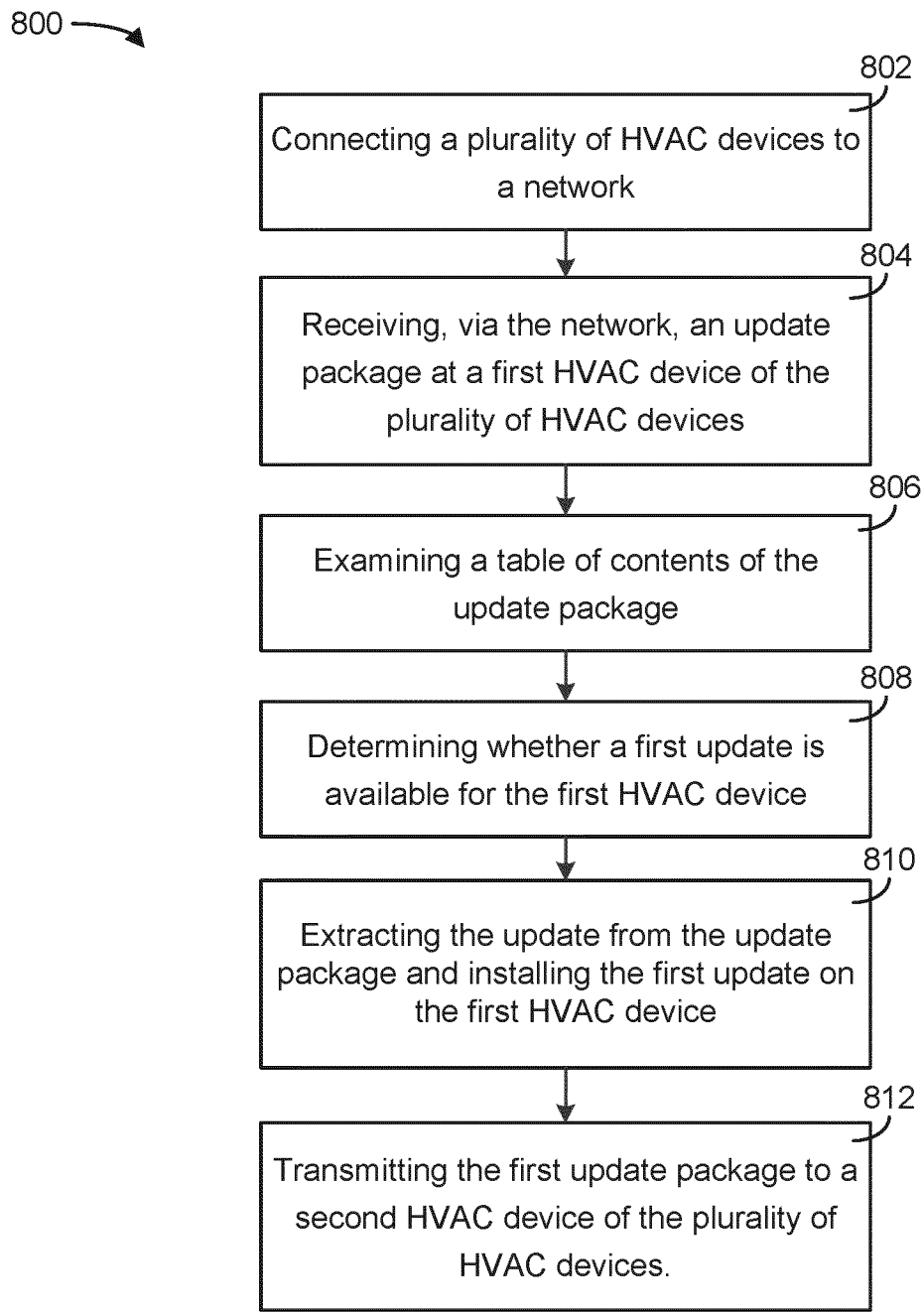
FIG. 8 is a flow diagram illustrating a process for updating HVAC device firmware in the BMS network of FIG. 2B, according to some embodiments.

Referring now to FIG. 8, a process 800 is shown, according to an exemplary embodiment. Process 800 may be configured to monitor and update various HVAC devices (e.g., HVAC device 402). Process 800 is shown to include connecting a plurality of HVAC devices to a network (step 802). In some embodiments, various HVAC devices are connected to network 208, as shown in FIG. 2A.

Process 800 is shown to further include receiving, via the network, an update package at a first HVAC device of the plurality of HVAC devices (step 802). In some embodiments, receiving an update package is similar to receiving update package 500 as shown in FIG. 5 or update package 600 as shown in FIG. 6. In some embodiments, various update packages (e.g., update packages 500, 600, etc.) are monitored for and received by various components on the HVAC device. For example, background download network object 444 may monitor for a new update package while processor 428 processes the update.

Process 800 is shown to include examining a table of contents of the update package (step 806). In some embodiments, the table of contents examined are similar to table of contents 502, 602 as described with reference to FIGS. 5-6. Table of contents may be examined by various components within HVAC device 402, such as background download network object 444. In some embodiments, the table of contents includes an update package version (e.g., device 1 update package 504) and a plurality of device model numbers of the plurality of HVAC devices.

Process 800 is shown to include determining whether a first update is available for the first HVAC device (step 808). Process 810 is shown to include extracting the update from the update package and installing the first update on the first HVAC device (step 810). Process 812 is shown to include transmitting the first update package to a second HVAC device of the plurality of HVAC devices (step 812). These steps may be performed automatically by processor 428 of HVAC device 402. HVAC device 402 may be only a single device within system 100 capable of receiving and implementing update packages, and the various steps of process 800 should not be limited to HVAC device 402 as it is described herein.

CONFIGURATION OF EXEMPLARY EMBODIMENTS

The construction and arrangement of the systems and methods as shown in the various exemplary embodiments are illustrative only. Although only a few embodiments have been described in detail in this disclosure, many modifications are possible. For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for updating heating, ventilation, or air conditioning (HVAC) devices, the method comprising:
    receiving an update package at a first HVAC device of a plurality of HVAC devices via a network, the update package including:
        an identification of a plurality of device models;
        a plurality of software updates, each of the software updates corresponding to one of the plurality of device models;
    determining that a device model for the first HVAC device is identified by the update package;
    in response to a determination that the device model for the first HVAC device is identified by the update package, extracting a first software update corresponding to the device model for the first HVAC device from the update package and installing the first software update on the first HVAC device; and
    transmitting the update package to a second HVAC device of the plurality of HVAC devices via the network.

2. The method of claim 1, wherein transmitting the update package to the second HVAC device comprises:
    determining that a device model for the second HVAC device is identified by the update package;
    extracting the first software update corresponding to the device model for the second HVAC device; and
    transmitting the update package to a third HVAC device of the plurality of HVAC devices.

3. The method of claim 1, wherein transmitting the update package to the second HVAC device comprises:
    determining that a device model of the second HVAC device is different than the device model of the first HVAC device;
    extracting a second software update from the update package and installing the second software update on the second HVAC device; and
    transmitting the update package to a third HVAC device of the plurality of HVAC devices.

4. The method of claim 3, further comprising:
    establishing device tiers within the plurality of HVAC devices, the device tiers comprising a first tier, a second tier, and a third tier, the HVAC devices in the first tier configured to control, at least in part, the HVAC devices in the second tier and the HVAC devices in the third tier, the second tier configured to control, at least in part, the HVAC devices in the third tier;
    wherein two or more HVAC devices within the first tier, second tier, or third tier have the same device models.

5. The method of claim 4, further comprising:
    transmitting the update package from an HVAC device in the first tier to an HVAC device in the second tier;
    extracting the second software update from the update package and installing the second software update on the second HVAC device; and
    transmitting the update package to a third HVAC device of the plurality of HVAC devices.

6. The method of claim 1, further comprising:
    connecting a first HVAC system in a first building to the network;
    connecting a second HVAC system in a second building to the network, the first HVAC system and second HVAC system comprising the plurality of HVAC devices; and
    providing, via the network, a plurality of update packages to the first HVAC system and the second HVAC system, the plurality of update packages comprising the update package.

7. The method of claim 1, wherein the plurality of HVAC devices comprises various HVAC controllers configured to provide control signals to HVAC building equipment, wherein the update package comprises one or more software updates, installation updates, or configuration updates, the update package configured to update the operation of one or more of the plurality of HVAC devices.

8. A building management system (BMS) comprising:
    an update package comprising an identification of an update package version; an identification of a plurality of device models; and a plurality of software updates, each of the software updates corresponding to one of the plurality of device models;
    a processing circuit comprising one or more processors and memory storing instructions that, when executed by the one or more processors, cause the one or more processors to perform operations comprising:
        receive the update package at a first HVAC device of a plurality of HVAC devices via a network;
        determine that a device model for the first HVAC device is identified by the update package; and
        in response to a determination that the device model for the first HVAC device is identified by the update package,
        extract a first software update corresponding to the device model for the first HVAC device from the update package and installing the first software update on the first HVAC device; and
        transmit the update package to a second HVAC device of the plurality of HVAC devices via the network.

9. The BMS of claim 8, wherein the processing circuit is further configured to:
- determine that a device model for the second HVAC device is identified by the update package;
- extract the first software update corresponding to the device model for the second HVAC device; and
- transmit the update package to a third HVAC device of the plurality of HVAC devices.

10. The BMS of claim 8, wherein the processing circuit is further configured to:
- determine that a device model of the second HVAC device is different than the device model of the first HVAC device;
- extract a second software update from the update package and installing the second software update on the second HVAC device; and
- transmit the update package to a third HVAC device of the plurality of HVAC devices.

11. The BMS of claim 10, wherein the processing circuit is further configured to:
- establish device tiers within the plurality of HVAC devices, the device tiers comprising a first tier, a second tier, and a third tier, the HVAC devices in the first tier configured to control, at least in part, the HVAC devices in the second tier and the HVAC devices in the third tier, the second tier configured to control, at least in part, the HVAC devices in the third tier;
- wherein two or more HVAC devices within the first tier, second tier, or third tier have the same device models.

12. The BMS of claim 11, wherein the processing circuit is further configured to:
- transmit the update package from an HVAC device in the first tier to an HVAC device in the second tier;
- extract the second software update from the update package and installing the second software update on the second HVAC device;
- transmit the update package to a third HVAC device of the plurality of HVAC devices.

13. The BMS of claim 10, wherein the processing circuit is further configured to:
- connect a first HVAC system in a first building to the network;
- connect a second HVAC system in a second building to the network, the first HVAC system and second HVAC system comprising the plurality of HVAC devices; and
- provide, via the network, a plurality of update packages to the first HVAC system and the second HVAC system, the plurality of update packages comprising the update package.

14. The BMS of claim 8, wherein the plurality of HVAC devices comprises various HVAC controllers configured to provide control signals to HVAC building equipment, wherein the update package comprises various software updates, installation updates, or configuration updates, the update package configured to update the operation of one or more of the plurality of HVAC devices.

15. A building management ecosystem for controlling heating, ventilation, or air conditioning (HVAC) systems across one or more buildings, the ecosystem comprising:
- a first HVAC system in a first building connected to a network and a second HVAC system in a second building to the network, the first HVAC system comprising a first plurality of HVAC devices and the second HVAC system comprising a second plurality of HVAC devices, a first HVAC device of the first plurality of HVAC devices comprising a processing circuit comprising one or more processors and memory storing instructions that, when executed by the one or more processors, cause the one or more processors to perform operations comprising:
  - receive an update package at the first HVAC device of the first plurality of HVAC devices via the network;
  - determine that a device model for the first HVAC device is identified by the update package; and
  - in response to a determination that the device model for the first HVAC device is identified by the update package,
  - extract a first software update corresponding to the device model for the first HVAC device from the update package and installing the first software update on the first HVAC device; and
  - transmit the update package to a second HVAC device of the second plurality of HVAC devices via the network.

16. The ecosystem of claim 15, wherein the processing circuit is further configured to:
- determine that a device model for the second HVAC device is identified by the update package;
- extract the first software update corresponding to the device model for the second HVAC device; and
- transmit the update package to a third HVAC device of the plurality of HVAC devices.

17. The ecosystem of claim 15, the processing circuit is further configured to:
- determine that a device model of the second HVAC device is different than the device model of the first HVAC device;
- extract a second software update from the update package and installing the second software update on the second HVAC device; and
- transmit the update package to a third HVAC device of the plurality of HVAC devices.

18. The ecosystem of claim 17, wherein the processing circuit is further configured to:
- establish device tiers within the plurality of HVAC devices, the device tiers comprising a first tier, a second tier, and a third tier, the HVAC devices in the first tier configured to control, at least in part, the HVAC devices in the second tier and the HVAC devices in the third tier, the second tier configured to control, at least in part, the HVAC devices in the third tier;
- wherein two or more HVAC devices within the first tier, second tier, or third tier have the same device models.

19. The ecosystem of claim 18, wherein the processing circuit is further configured to:
- transmit the update package from an HVAC device in the first tier to an HVAC device in the second tier;
- extract the second software update from the update package and installing the second software update on the second HVAC device; and
- transmit the update package to a third HVAC device of the plurality of HVAC devices.

20. The ecosystem of claim 15, wherein the processing circuit is further configured to:
- provide, via the network, a plurality of update packages to the first HVAC system and the second HVAC system, the plurality of update packages comprising the update package.

* * * * *